US010627506B2

(12) United States Patent
Lim et al.

(10) Patent No.: US 10,627,506 B2
(45) Date of Patent: Apr. 21, 2020

(54) METHOD FOR REMOVING NOISE TONE IN DIGITAL REGION OF IMAGING RADAR RECEIVER, IMAGING RADAR RECEIVER THEREFOR, AND PROGRAM RECORDING MEDIUM (71) Applicant: KOREA AEROSPACE RESEARCH INSTITUTE, Daejeon (KR)

(72) Inventors: Byoung-Gyun Lim, Sejong-si (KR); Sang-Burm Ryu, Daejeon (KR); Jae-Cheol Yoon, Daejeon (KR); Jin-Hee Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 324 days.

(21) Appl. No.: 15/529,693

(22) PCT Filed: Dec. 11, 2014

(86) PCT No.: PCT/KR2014/012192
§ 371 (c)(1),
(2) Date: May 25, 2017

(87) PCT Pub. No.: WO2016/088927
PCT Pub. Date: Jun. 9, 2016

(65) Prior Publication Data
US 2017/0328999 A1 Nov. 16, 2017

(30) Foreign Application Priority Data
Dec. 5, 2014 (KR) .................. 10-2014-0173683

(51) Int. Cl.
G01S 13/90 (2006.01)
G01S 7/02 (2006.01)
(Continued)

(52) U.S. Cl.
CPC .............. *G01S 13/90* (2013.01); *G01S 7/023* (2013.01); *G01S 7/2922* (2013.01);
(Continued)

(58) Field of Classification Search
CPC ......... G01S 13/90; G01S 7/023; G01S 7/2922
See application file for complete search history.

(56) References Cited

U.S. PATENT DOCUMENTS

2002/0155812 A1* 10/2002 Takada ................... H04B 1/123
455/63.1
2011/0012778 A1* 1/2011 Nguyen .............. G01S 13/9089
342/25 A (Continued)

FOREIGN PATENT DOCUMENTS

JP 2003-344532 A 12/2003
KR 10-2012-0032170 A 4/2012
KR 10-2013-0093300 A 8/2013

*Primary Examiner* — Marcus E Windrich
(74) *Attorney, Agent, or Firm* — Novick, Kim & Lee, PLLC; Jae Youn Kim (57) ABSTRACT The present invention relates to a method for removing a noise tone in a digital region of an imaging radar receiver, an imaging radar receiver therefor, and a program recording medium. A method for removing a noise tone in a digital region of an imaging radar receiver using a D-ramping structure according to an embodiment of the present invention is characterized by comprising the steps of: (a) extracting a noise tone location of a D-ramped image signal; (b) selecting a noise tone to be removed from the extracted noise tones using step (a); and (c) removing the selected noise tone of step (b) from source data.

10 Claims, 12 Drawing Sheets
(4 of 12 Drawing Sheet(s) Filed in Color)

(51) Int. Cl.
*G01S 7/292* (2006.01)
*G01S 7/40* (2006.01)
*G01S 7/288* (2006.01)

(52) U.S. Cl.
CPC ..... *G01S 7/4021* (2013.01); *G01S 2007/2883* (2013.01); *G01S 2007/2886* (2013.01)

(56) References Cited

U.S. PATENT DOCUMENTS

| | | | | |
|---|---|---|---|---|
| 2011/0163912 | A1* | 7/2011 | Ranney | G01S 13/90 342/25 F |
| 2012/0262324 | A1* | 10/2012 | Samaniego | G01S 13/885 342/22 |
| 2013/0244710 | A1* | 9/2013 | Nguyen | G01S 13/0209 455/501 |
| 2014/0347213 | A1* | 11/2014 | Nguyen | H04B 15/00 342/25 F |

* cited by examiner

METHOD FOR REMOVING NOISE TONE IN DIGITAL REGION OF IMAGING RADAR RECEIVER, IMAGING RADAR RECEIVER THEREFOR, AND PROGRAM RECORDING MEDIUM

TECHNICAL FIELD

The present invention relates to a noise tone removal technique in a digital region of an imaging radar receiver, and more particularly, to a method for removing a noise tone in the digital region of an imaging radar receiver when an undesired noise tone occurs in a deramped signal due to hardware characteristics, an imaging radar receiver therefor, and a program recording medium.

BACKGROUND ART

Figure 1:
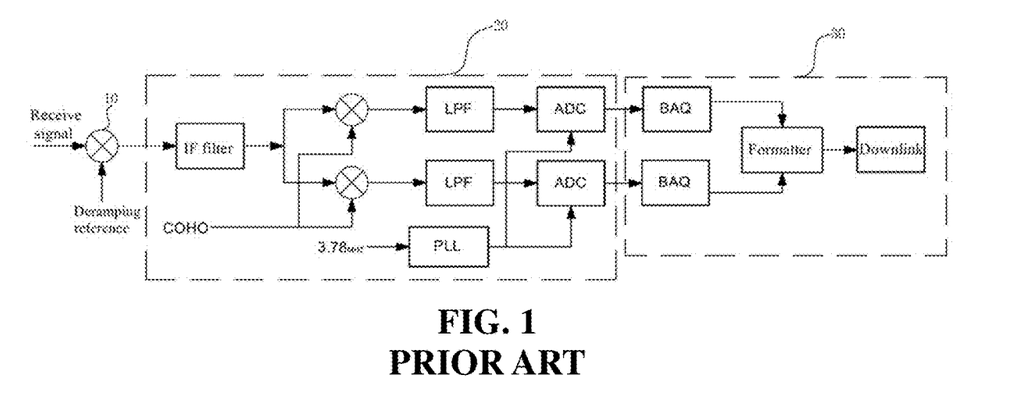
FIG. 1 is a block diagram illustrating configuration of a radar receiver using a conventional deramping structure.

FIG. 1 is a block diagram illustrating configuration of a radar receiver using a conventional deramping structure.

Referring to FIG. 1, a radar receiver using a conventional deramping structure includes a signal synthesizing unit 10, a receiving unit 20, and a compression and transmission unit 30. The receiving unit 20 includes an IF (Intermediate Frequency) filter, a synthesizer, a low pass filter (LPF), and an analog to digital converter (ADC), thereby converting a synthesized signal into a baseband received signal. The compression and transmission unit 30 includes a BAQC (Block Adaptive Quantization) unit, a formatter, and a downlink, thereby transforming the received signal according to a compression and storage format and downlinking the received signal to a ground station.

As shown in FIG. 1, noise tones such as a spurious tone or a harmonic tone added by an external clock or power do not appear in the time domain. However, in the deramping circuit, noise appears in the form of tone after passing through an IF filter and a matched filter.

Figure 2:
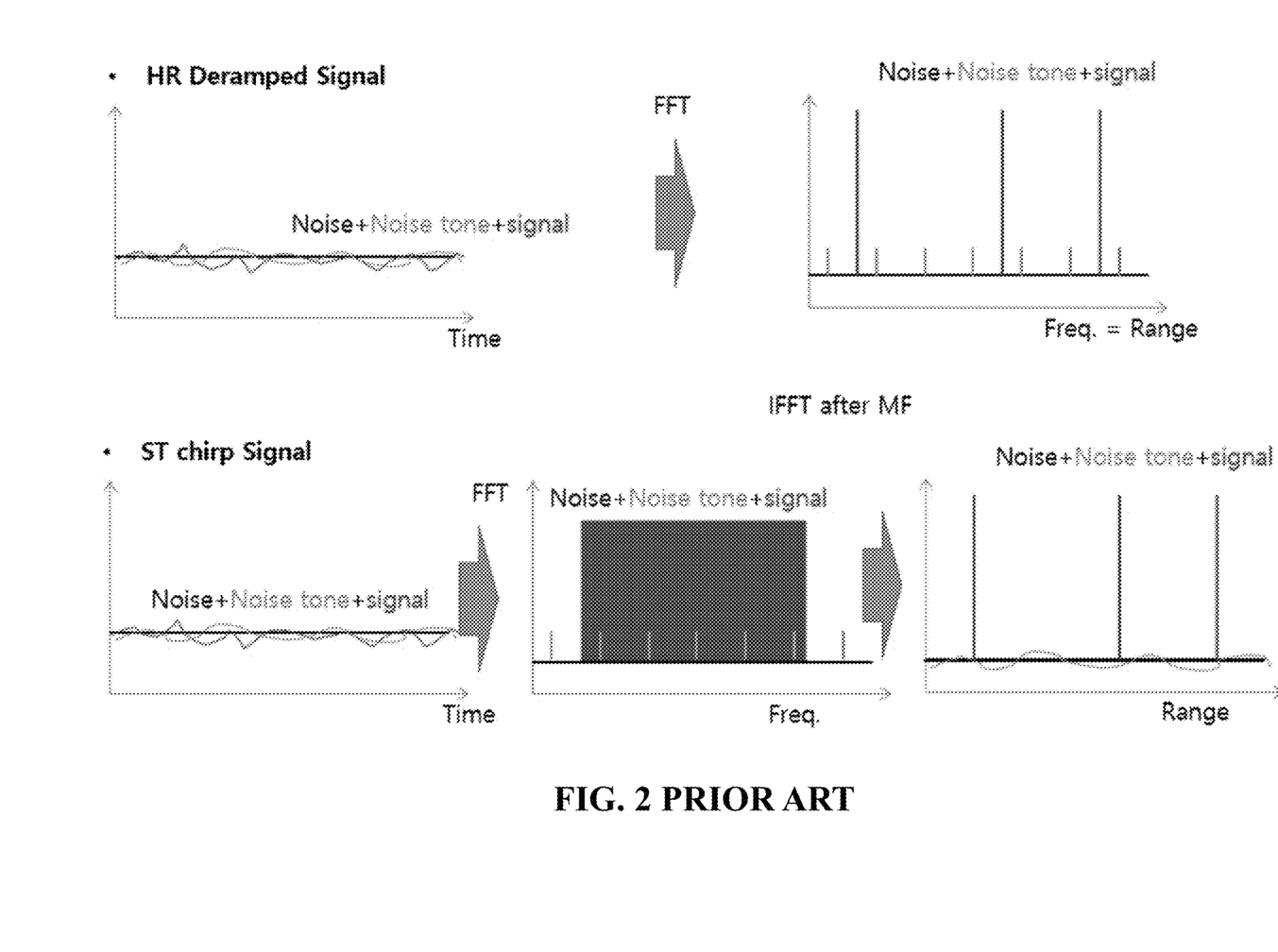
FIG. 2 illustrates a spurious tone effect in the deramping procedure.

FIG. 2 illustrates a spurious tone effect in the deramping operation. As shown in FIG. 2, the influence of the noise tone appears in the form of tone in the frequency domain, and finally appears as an undesired bright line in the actual image due to the nature of deramping, in which the frequency domain is a distance domain.

In the prior art, the aforementioned issue is addressed in hardware. However, after implementation of hardware, the issue may be raised again with aging or impact during operation. In addition, this issue is fatal in special cases, such as satellite systems, which cannot be accessed after launch.

DISCLOSURE

Technical Problem

Therefore, the present invention has been made in view of the above problems, and it is a general object of the present invention to provide a method for removing noise tones in the digital region of an imaging radar receiver, a radar receiver therefor, and a program recording medium which can substantially address various problems caused by limitations and disadvantages of the prior art.

It is another specific object of the present invention to provide a method for removing noise tones in the digital region of an imaging radar receiver, a radar receiver therefor, and a program recording medium which can remove undesired noise tones in a deramped signal.

Technical Solution

In accordance with an aspect of the present invention, the above and other objects can be accomplished by the provision of a method for removing a noise tone in a digital region of an imaging radar receiver which uses a deramping structure, the method including (a) extracting a position of noise tones of a deramped image signal, (b) selecting a noise tone to be removed from among the noise tones extracted in step (a), (c) removing the noise tone selected by step (b) from raw data.

In the method, the step (a) may include at least one of detecting the position of the noise tones from a noise packet, and detecting the position of the noise tones from raw data.

In the method, the detecting of the position of the noise tones from the noise packet may include removing a fluctuation component present in the noise packet through a curve fitting technique, setting a threshold from an average and a standard distribution of the noise packet, detecting a big tone based on the threshold, and detecting a small tone based on the threshold.

In the method, the detecting of the big tone may include detecting the big tone as a noise tone even when one big tone is detected.

In the method, the detecting of the small tone may performed when the small tone is present in at least three packets in at the same time or may be a harmonic component at a specific frequency.

In the method, detecting the harmonic component may include performing fast Fourier transform of noise packets before and after acquisition and after acquisition of an image and detecting a high peak value greater than the threshold, and frequency-transforming the detected peak value and detecting a noise tone causing a problem at a certain frequency (position).

In the method, the detecting of the position of the noise tones from the raw data may include synthesizing the raw data in an azimuth direction to detect the noise packet, removing a fluctuation component present in the noise packet through a curve fitting technique,
setting a threshold from an average and a standard distribution of the noise packet, detecting a big tone based on the threshold, and detecting a small tone based on the threshold.

In the method, the detecting of the position of the noise tones from the noise packet may be applied in an urban area or an area having a relatively large reflector.

In the method, the detecting of the position of the noise tones from the noise packet and the detecting of the position of the noise tones from the raw data may be simultaneously applied to a homogeneous region.

In the method, the step (c) may include selecting n left and right pixels of a position where the noise tone is generated and acquiring a representative value, and performing phase-extension inverse filtering (PEIF) on the representative value.

In the method, the representative value may be acquired using one of an average method, a median method, and a composite method.

In accordance with another aspect of the present invention, there is provided an imaging radar receiver including a signal synthesizing unit for synthesizing a received signal according to a deramping reference, a receiving unit for converting the signal deramped by the signal synthesizing unit into a baseband received signal, a compression and transmission unit for transforming a signal received from the receiving unit according to a compression and storage format and downlinking the transformed signal to a ground station, and an image processing unit for extracting a noise packet from raw data downlinked from the compression and transmission unit and analyzing the noise packet in the frequency domain to remove an extracted noise tone.

In the imaging radar receiver, the image processing unit may include a noise packet extraction module for extracting a position of noise tones of a deramped image signal, a noise packet analysis module for selecting a noise tone to be removed from among the noise tones extracted by the noise packet extraction module, and a noise tone removal module for removing the selected noise tone from the raw data.

In the imaging radar receiver, the noise packet extraction module may be configured to extract the position of the noise tones using at least one of a method of extracting the position of the noise tones from the noise packet and a method of extracting the position of the noise tones from the raw data.

Advantageous Effects

With a method for removing noise tones in the digital region of an imaging radar receiver, and an imaging radar receiver therefore, and a program recording medium according to embodiments of the present invention, when an undesired noise tone emerges in a deramped signal due to hardware characteristics, noise tones from a noise packet and raw data can be extracted by analyzing the characteristics of the noise tones and the received signal, a noise tone to be actually removed may be selected from among the extracted noise tones, and finally the selected noise tone may be removed from the raw data using a noise tone removal technique. Thus, image deterioration by the noise tones may be suppressed with minimized loss of target object information.

DESCRIPTION OF DRAWINGS

The patent or application file contains at least one drawing/photograph executed in color. Copies of this patent or patent application with color drawing(s)/photograph(s) will be provided by the Office upon request and payment of the necessary fee.

BEST MODE

Hereinafter, embodiments of the present invention will be described in detail with reference to the accompanying drawings.

In describing the present invention, a detailed description of well-known functions and constituents will be omitted if it is determined that such description can unnecessarily obscure the gist of the present invention. In addition, terms used herein are defined in consideration of the functions of the corresponding elements in the present invention. The definitions of the terms may vary depending on the intention of a user or operator, practices, or the like. Therefore, the terms should be defined based on the entire specification.

Figure 3:
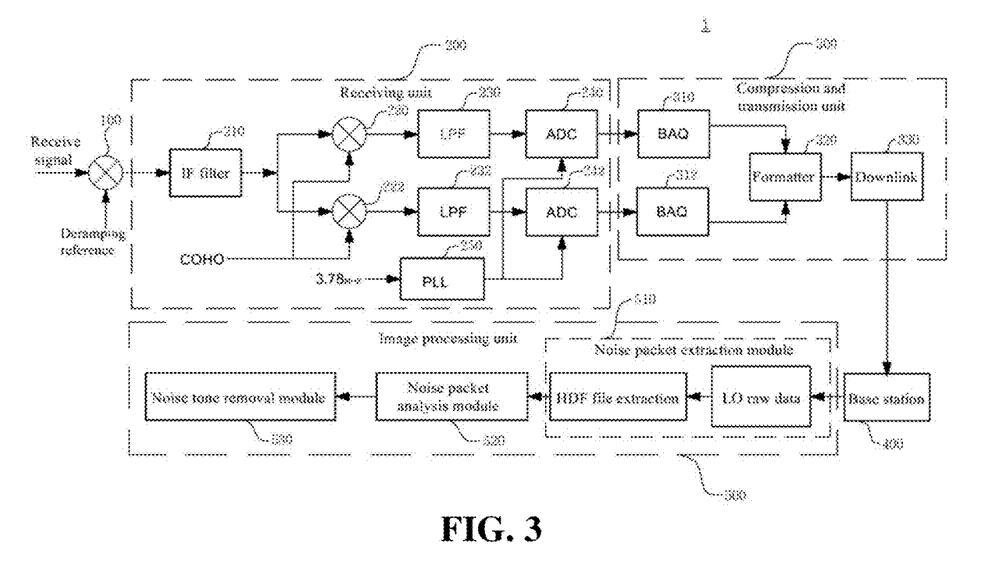
FIG. 3 is a block diagram illustrating configuration of a radar receiver according to an embodiment of the present invention.

FIG. 3 is a block diagram illustrating configuration of a radar receiver according to an embodiment of the present invention.

Referring to FIG. 3, a radar receiver 1 includes a signal synthesizing unit 100, a receiving unit 200, a compression and transmission unit 300, a ground station 400, and an image processing unit 500.

The signal synthesizing unit 100 synthesizes a received signal according to a deramping reference.

The receiving unit 200 includes an intermediate frequency (IF) filter 210, synthesizers 220 and 222, low pass filters (LPFs) 230 and 232, analog-to-digital converters (ADCs) 240 and 242, and a phase locked loop (PLL) 250, thereby converting a signal deramped by the signal synthesizing unit 100 into a baseband received signal. Here, the reference clock of the PLL 250 for generating the clock of the ADCs 240 and 242 may be 3.75 MHz, and the clock frequency adjustment unit of the output of the PLL 250 may be 3.75 MHz.

The compression and transmission unit 300 includes a BAQ (block adaptive quantization) 310, a formatter 320, and a downlink 330, thereby transforming the signal received from the receiving unit 200 according to the compression and storage format, and downlinks the transformed signal to the ground station 400.

The image processing unit 500 includes a noise packet extraction module 510, a noise packet analysis module 520, and a noise tone removal module 530. The image processing unit 500 extracts a noise packet from LO raw data downlinked from the compression and transmission unit 300 to the ground station 400, and removes a noise tone extracted by analyzing the extracted noise packet in the frequency domain.

Hereinafter, a method for removing a noise tone in the radar receiver according to an embodiment configured as above will be described.

Figure 4:
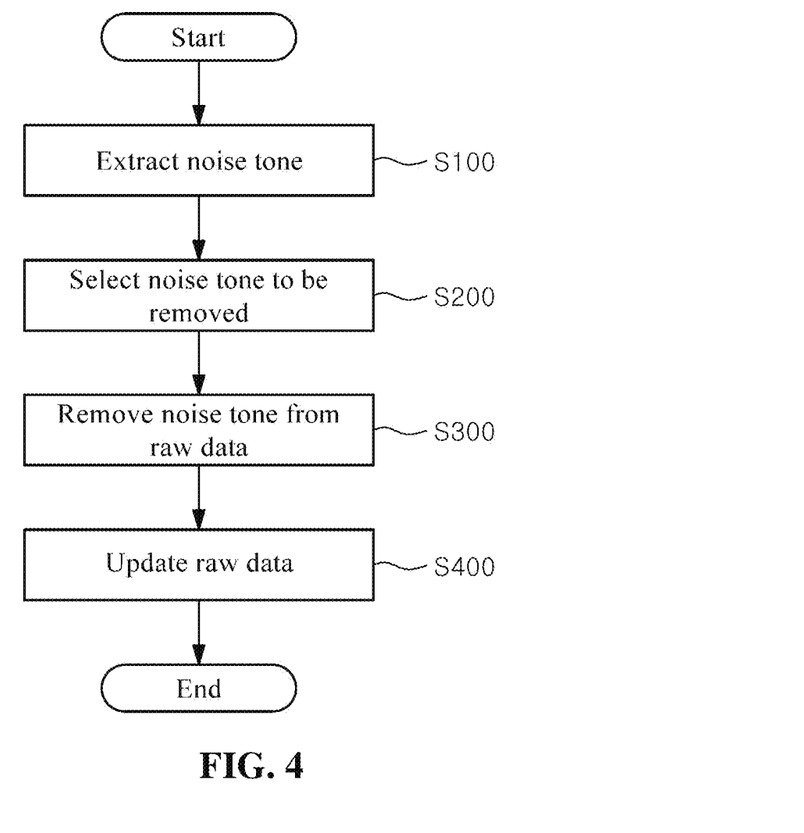
FIG. 4 is a flowchart illustrating a noise tone removal procedure in the digital region of an imaging radar receiver according to an embodiment of the present invention.

FIG. 4 is a flowchart illustrating a method for removing a noise tone in the digital region of an imaging radar receiver according to an embodiment of the present invention.

Referring to FIG. 4, the noise tone removal method includes extracting positions of noise tones (S100), selecting a noise tone to be removed from among the extracted noise tones (S200), removing the extracted noise tone from raw data (S300), and updating the raw data (S400).

Techniques of extracting the positions of noise tones may be broadly divided into two methods. One method is to detect the positions of noise tones from a noise packet and the other is to detect the positions of noise tones directly from the raw data.

Figure 5:
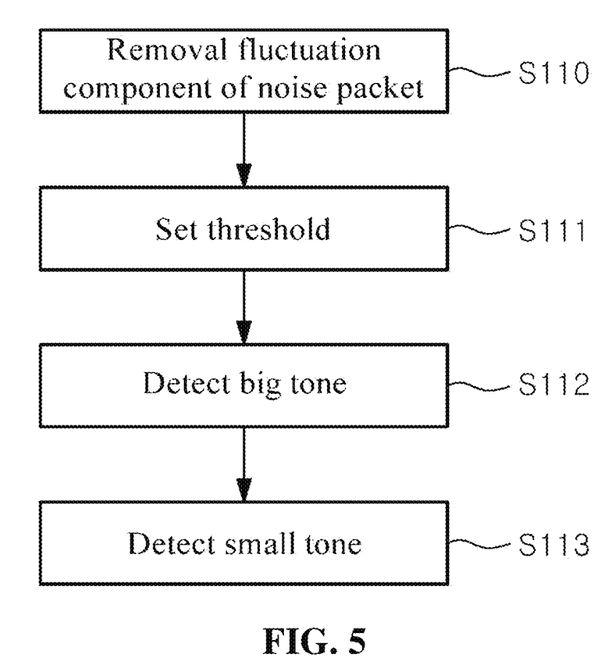
FIGS. 5 and 6 illustrate a procedure of detecting the positions of noise tones from a noise packet.
Figure 6:
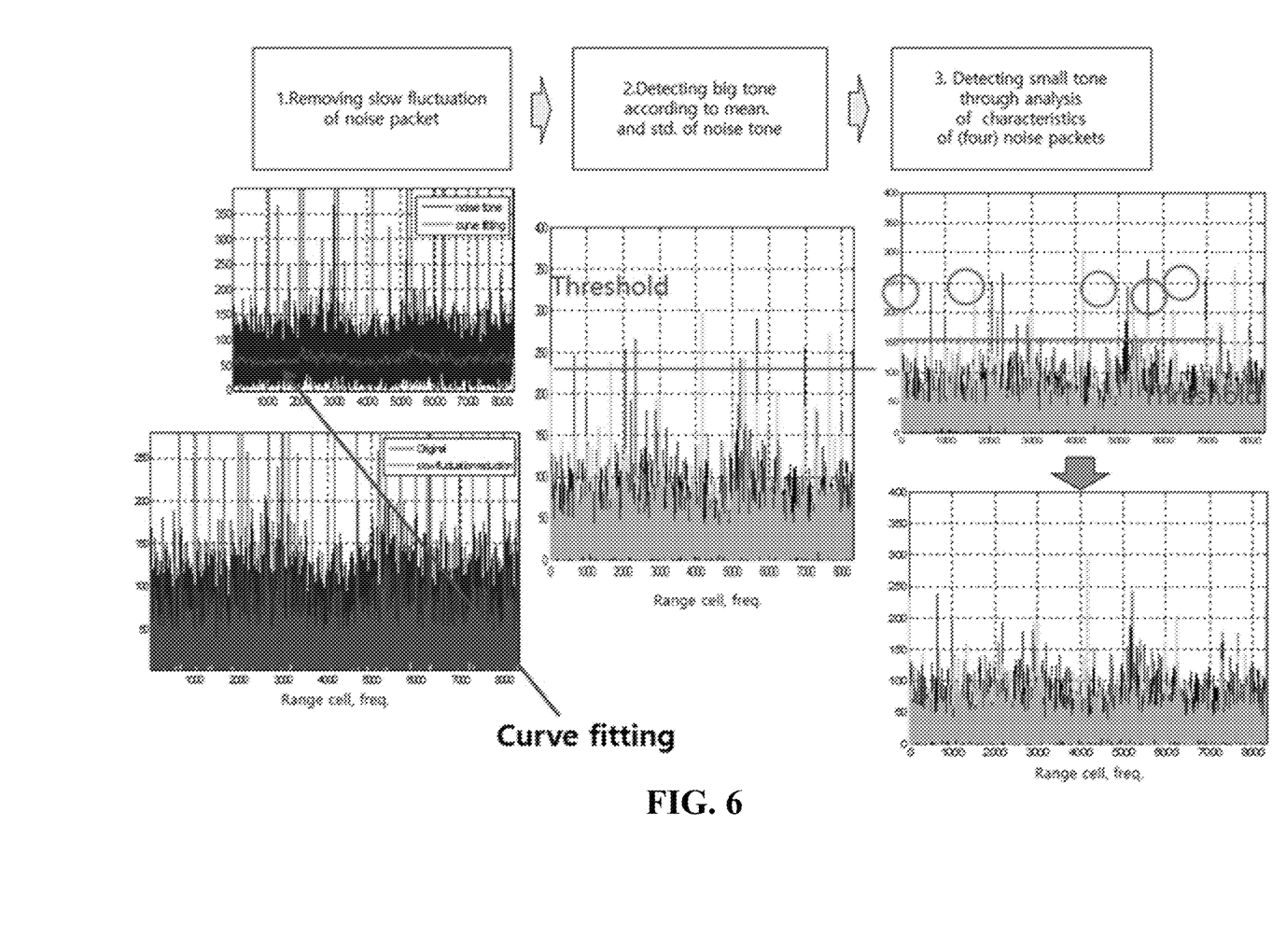

The method of detecting the positions of noise tones from a noise packet is described below. FIGS. 5 and 6 illustrate a procedure of detecting the positions of noise tones from a noise packet.

Referring to FIGS. 5 and 6, a fluctuation component present in a noise packet is removed first using a curve fitting technique (S110).

Generally, the imaging radar collects various data to acquire the state of the hardware and various kinds of information before and after acquiring raw data.

The noise packet is one of the collected data. In order to check the noise level of the entire hardware, a noise packet before acquisition of the raw data (start noise packet) and a noise packet after acquisition of the raw data (stop noise packet) are acquired. Since these packets contain information about the hardware, these data may be used to extract the positions of noise tones generated from the hardware.

In the noise packet, the distance data is in the same domain as the distance frequency in a deramped signal. Therefore, in order to extract a problematic noise tone, the noise packet only needs to be frequency-transformed to find the problematic noise tone at a certain frequency (position).

However, since the noise packet itself has a slow fluctuation, setting a threshold to extract a noise tone may cause a problem such as attenuation of detection sensitivity. Therefore, the fluctuation component is removed from the noise packet using the curve fitting technique.

Next, a mean and a standard distribution (std.) of the noise packet are estimated, and a threshold is set based thereon (S111). Basically, the threshold is set to the mean+wx standard distribution, where w is a weight that is empirically set according to the characteristics of the image.

Next, a big tone is detected (S112). The big tone is a noise of high power and is detected by setting a high threshold. Even when the big tone is in only one packet, it is detected.

Next, a small tone is detected (S113). The small tone is detected by setting a low threshold. The small tone is present in three or more packets at the same time, or the harmonic component of the source frequency (usually ADC drive frequency, etc.) causing the problem is detected.

Figure 7:
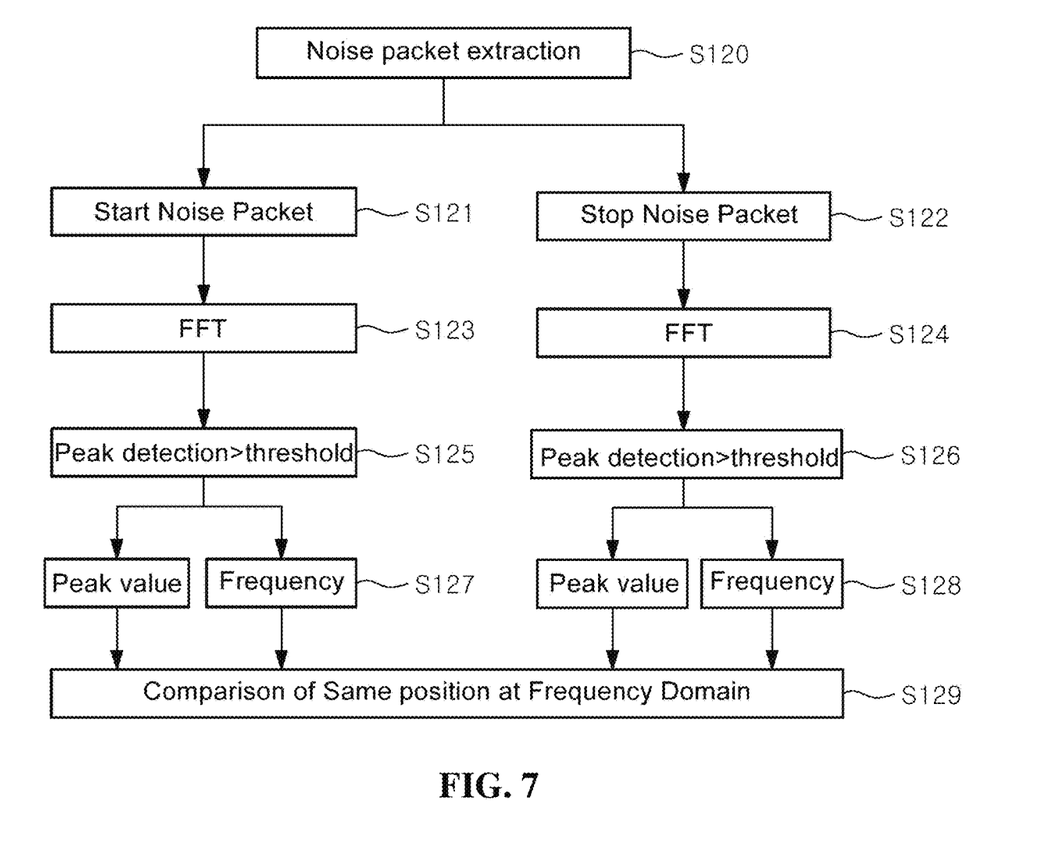
FIG. 7 is a flowchart illustrating a procedure of detecting a harmonic component of a noise packet.

FIG. 7 is a flowchart illustrating a procedure of detecting a harmonic component of a noise packet.

Referring to FIG. 7, the procedure of detecting the harmonic component includes extracting noise packets (S120), performing fast Fourier transform (FFT) on the noise packets (S121, S122) obtained before and after acquisition of an image (S123, S124), detecting peak values greater than a threshold (S125, S126), and performing frequency transformation (S127, S128) and detecting a problematic noise tone at a certain frequency (position) (S129).

Second, the method of extracting the position of noise tones from raw data is described below.

Figure 8:
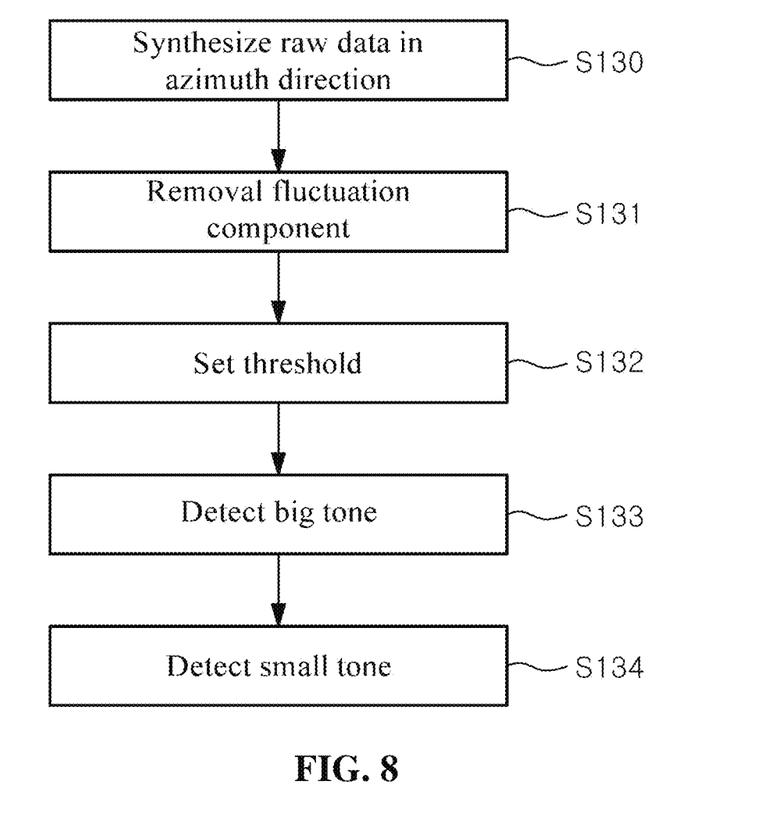
FIGS. 8 and 9 illustrate a procedure of detecting the positions of noise tones from raw data.
Figure 9:
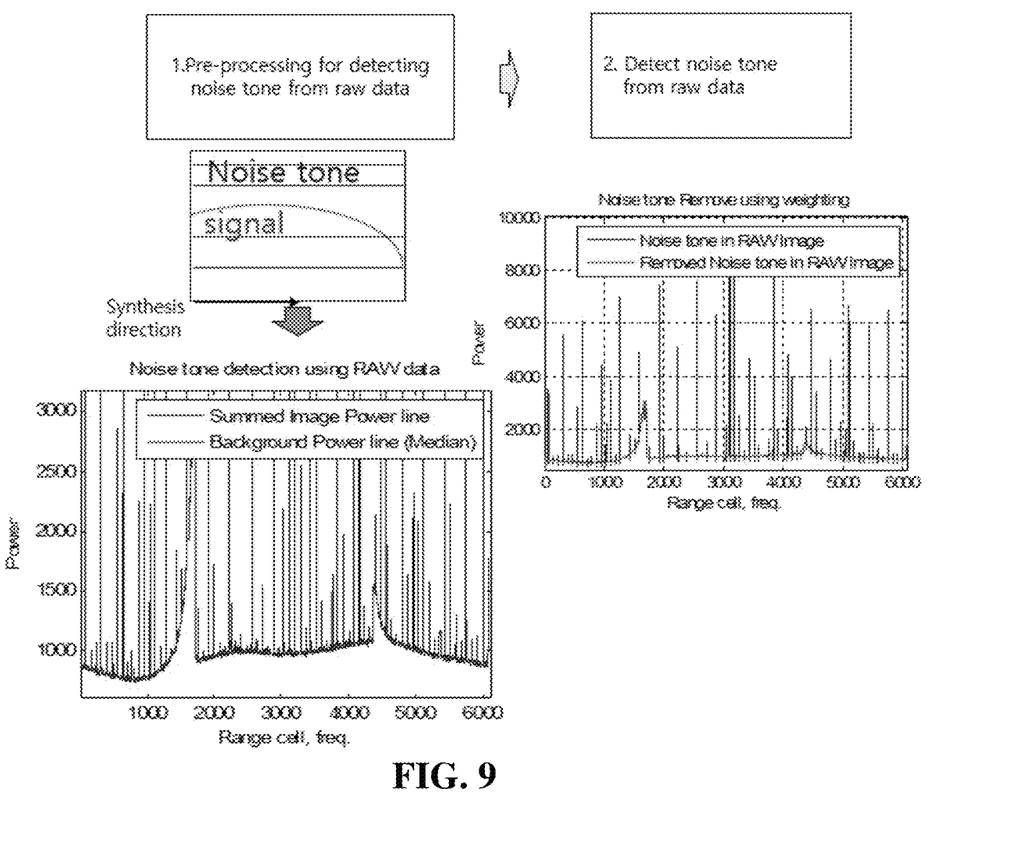

FIGS. 8 and 9 illustrate a procedure of detecting the positions of noise tones from raw data.

Referring to FIGS. 8 and 9, a noise packet is detected by synthesizing raw data in an azimuth direction (S130). The noise tones are located at the same distance, while a signal created by a target or background has a parabolic form due to the influence of RCM. As a result, when a single distance profile is created by synthesizing the raw data in the azimuth direction, the noise tones are synthesized at the same position and thus have a large amplitude, while the signal spreads. This synthesized reference signal can be used to detect the position of the noise tones.

Next, the position of the noise tones may be detected by performing the same procedure as the procedure of detecting the position of a noise tone from a noise packet, namely, by removing a fluctuation component through curve fitting (S131), setting a threshold (S132), detecting a big tone (S133), and detecting a small tone.

Referring back to FIG. 4, a noise tone to be removed is selected from among the noise tones extracted in step S100 (S200). The noise tones detected through the noise packets and the raw data are selectively used according to the characteristics of the image. Basically, the noise tones detected through the noise packets can be used for all images because they are noise characteristics that must be removed.

However, noise tones detected using the raw data should be selectively used according to the characteristics of the image. If there is a large reflector in a part of the image, there is a possibility of noise tone detection failure or false noise tone detection.

For example, in an urban area or a region where a large reflector is located, only the detection method using noise packets is employed. In a homogeneous region, both detection methods should be applied at the same time to remove noise tones without missing any noise tone.

Figure 10:
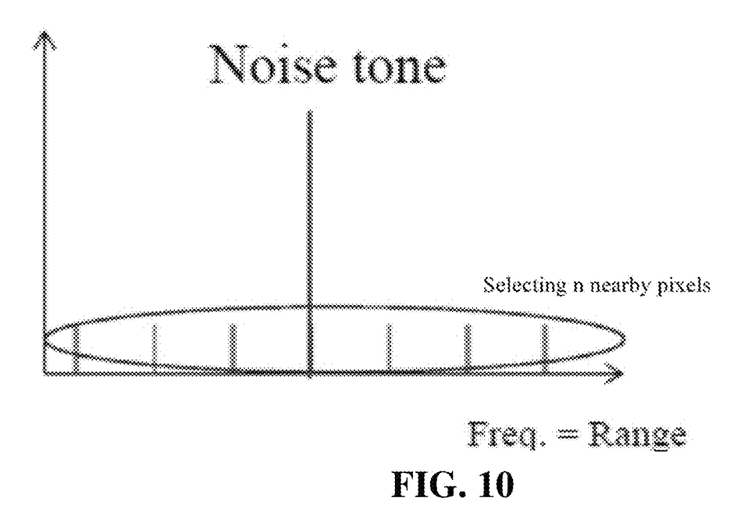
FIG. 10 is a diagram illustrating a pixel selection method for setting a representative value.

Next, the noise tone is removed from the raw data (S300). In the noise tone removal operation, n pixels on the left and right sides of the position where the noise tones appear are selected based on the position of the noise tones detected in the above-described procedure to find a representative value, as shown in FIG. 10.

Then, phase-extension inverse filtering (PEIF) is applied such that the amplitude of a corresponding noise tone has a representative value. PEIF is a method of reducing the amplitude of the existing noise tone while maintaining the phase information about the noise tone position. This filtering may attenuate image degradation caused by the noise tone while minimizing the loss of the target object information due to the characteristics of the SAR image in which the characteristics of a target object are contained in the phase information.

There are three methods which can be used to acquire the representative value: average, median, and composite. For a homogeneous image, the representative value is estimated using the average method since fluctuation of the surrounding pixel size is small. For an image in which the fluctuation of the surrounding pixel size is large, the representative value is estimated using the median method. The composite method (a weighted mean of the average and the median) is an integration of the two aforementioned methods. This method can acquire the advantages of the average method and the median method at the same time by changing the weight according to the characteristics of the image.

Next, the raw data is updated (S400), and the noise tone detection procedure is terminated.

Figure 11:
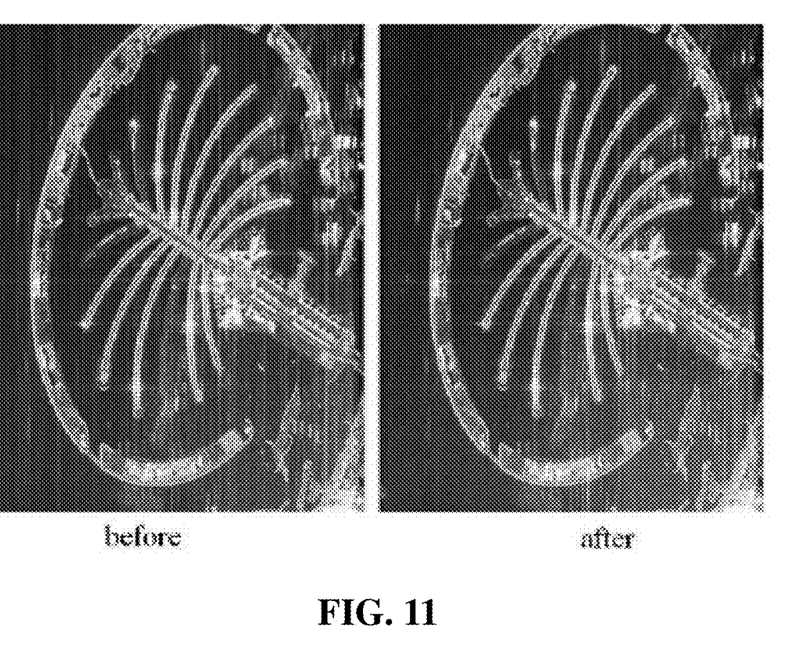
FIGS. 11 and 12 show images of a specific area before and after removing a noise tone according to an embodiment of the present invention, wherein the 'before' images of FIGS. 11 and 12 represent the raw data before a noise tone is removed, and the 'after' images of FIGS. 11 and 12 represent the raw data after the noise tone is removed.
Figure 12:
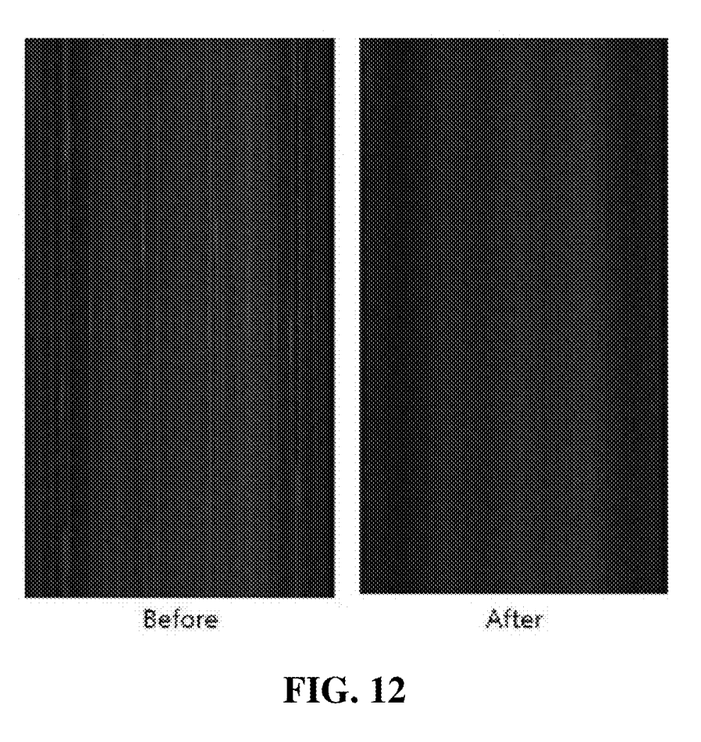

FIGS. 11 and 12 show images of a specific area before and after removing a noise tone according to an embodiment of the present invention, wherein the 'before' images of FIGS. 11 and 12 represent the raw data before a noise tone is removed, and the 'after' images of FIGS. 11 and 12 represent the raw data after the noise tone is removed. It can be confirmed through these figures that the noise tone has been removed from the raw data.

Embodiments of the present invention include computer readable media including program commands for performing various computer-implemented operations. The computer readable media may include a program command, a local data file, a local data structure, and the like, alone or in combination. The media may be those specially designed and constructed for the present invention or may be those known and available to those skilled in the computer software. Examples of computer readable recording media include magnetic media such as hard disks, floppy disks and magnetic tape, optical media such as CD-ROMs and DVDs, magneto-optical media such as floptical disks, and hardware devices such as ROM, RAM and flash memories which are specifically designed to store and execute program commands Examples of program commands include machine language code such as that generated by a compiler, as well as high-level language code that may be executed by a computer using an interpreter, etc.

While the present invention has been described in connection with what is presently considered to be practical exemplary embodiments, it is to be understood that the invention is not limited to the disclosed embodiments, but, on the contrary, those skilled in the art will appreciate that various changes, substitutions, and alterations may be made without departing from the scope of the present invention.

Accordingly, the scope of the present invention should not be construed as being limited to the embodiments described, but should be construed as including not only the following claims, but also equivalents to the claims.

| Reference Numerals | |
|---|---|
| 1: Radar receiver | |
| 100: Signal synthesizing unit | |
| 200: Receiving unit | 210: IF filter |
| 220, 222: Synthesizer | 230, 232: LPF |
| 240, 242: ADC | 250: PLL |
| 300: Compression and transmission unit | 310, 312: BAQ |
| 320: Formatter | 330: Downlink |
| 400: Ground station | |
| 500: Image processing unit module | 510: Noise packet extraction |
| 520: Noise packet analysis module | 530: Noise tone removal module |

The invention claimed is:

1. A method for removing a noise tone in a digital region of an imaging radar receiver which uses a deramping structure, the method comprising:
   (a) extracting positions of noise tones of a deramped image signal;
   (b) selecting the noise tone to be removed from among the noise tones extracted in step (a); and
   (c) removing the noise tone selected by step (b) from raw data,
   wherein the step (c) comprises:
   selecting n left and right pixels of a position where the noise tone is generated and acquiring a representative value; and
   performing phase-extension inverse filtering (PEIF) on the representative value.

2. The method according to claim 1, wherein the step (a) comprises at least one of:
   detecting the positions of the noise tones from a noise packet; and
   detecting the positions of the noise tones from the raw data.

3. The method according to claim 2, wherein the detecting of the positions of the noise tones from the noise packet comprises:
   removing a fluctuation component present in the noise packet through a curve fitting technique;
   setting a first threshold and a second threshold which is lower than the first threshold from an average and a standard distribution of the noise packet;
   detecting a big tone higher than the first threshold; and
   detecting a small tone lower than the second threshold.

4. The method according to claim 3, wherein the detecting of the big tone comprises:
   detecting the big tone as a noise tone even when the big tone is present in at least one packet.

5. The method according to claim 3, wherein the detecting of the small tone is performed when the small tone is present in at least three packets at the same time or is a harmonic component at a specific frequency.

6. A method for removing a noise tone in a digital region of an imaging radar receiver which uses a deramping structure, the method comprising:
   (a) extracting positions of noise tones of a deramped image signal;
   (b) selecting the noise tone to be removed from among the noise tones extracted in step (a); and
   (c) removing the noise tone selected by step (b) from raw data,
   wherein the detecting of the positions of the noise tones from the raw data comprises:
   synthesizing the raw data in an azimuth direction to detect the noise packet;
   removing a fluctuation component present in the noise packet through a curve fitting technique;
   setting a first threshold and a second threshold which is lower than the first threshold from an average and a standard distribution of the noise packet;
   detecting a big tone higher than the first threshold; and
   detecting a small tone lower than the second threshold.

7. The method according to claim 2, wherein the detecting of the positions of the noise tones from the noise packet is applied in an urban area or an area having a relatively large reflector.

8. The method according to claim 2, wherein the detecting of the positions of the noise tones from the noise packet and the detecting of the positions of the noise tones from the raw data are simultaneously applied to the digital region.

9. The method according to claim 1, wherein the representative value is acquired using one of an average method, a median method, and a composite method.

10. A program recording medium on which a program for executing the method for removing a noise tone in a digital region of an imaging radar receiver according to claim 1 is recorded.

* * * * *